US006938252B2

(12) United States Patent
Baylor et al.

(10) Patent No.: US 6,938,252 B2
(45) Date of Patent: Aug. 30, 2005

(54) HARDWARE-ASSISTED METHOD FOR SCHEDULING THREADS USING DATA CACHE LOCALITY

(75) Inventors: Sandra Johnson Baylor, San Jose, CA (US); Rahul Merwah, Parlin, NJ (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 09/737,129

(22) Filed: Dec. 14, 2000

(65) Prior Publication Data

US 2002/0078124 A1 Jun. 20, 2002

(51) Int. Cl.[7] ............................. G06F 9/46; G06F 12/00
(52) U.S. Cl. ...................... 718/102; 718/104; 711/118; 711/147
(58) Field of Search .................................. 718/100, 102, 718/104, 107, 108; 711/3, 117, 118, 130, 135, 147

(56) References Cited

U.S. PATENT DOCUMENTS

| 5,724,586 A | * | 3/1998 | Edler et al. ................. 718/102 |
| 5,745,778 A | * | 4/1998 | Alfieri ........................... 712/1 |
| 5,974,438 A | * | 10/1999 | Neufeld ....................... 718/104 |
| 6,289,369 B1 | * | 9/2001 | Sundaresan ................. 718/103 |

OTHER PUBLICATIONS

Bellosa et al. "The Performance Implications of Locality Information Used in Shared–Memory Multiprocessors", Journal of Parallel and Distributed Computing, vol. 37, No. 1, pp. 113–121, Aug. 1996.*

Philbin et al. "Thread Scheduling for Cache Locality", ASPLOS VII, pp. 60–71, Oct. 1996.*
Sinharoy, B. "Optimized Thread Creation for Processor Multithreading", The Computer Journal, 40(6), pp. 388–400, 1997.*
Nikolopoulos et al. "Efficient Runtime Thread Management for the Nano–Threads Programming Model", 12th International Parallel Processing Symposium and 9th Symposium on Parallel and Distributed Processing, pp. 183–194, Mar. 1998.*
Weissman, B. "Performance Counters and State Sharing Annotations: a Unified Approach to Thread Locality", ASPLOS VIII, pp. 127–138, Oct. 1998.*
M. Steckermeier et al. "Using Locality Information in User Level Scheduling", University Erlangen–Nurnberg, Tech. Report TR–95–14, 1995.*

* cited by examiner

*Primary Examiner*—Meng-Al T. An
*Assistant Examiner*—Syed J Ali
(74) *Attorney, Agent, or Firm*—F. Chau & Associates, LLC

(57) ABSTRACT

A method is provided for scheduling threads in a multi-processor system. In a first structure thread ids are stored for threads associated with a context switch. Each thread id identifies one thread. In a second structure entries are stored for groups of contiguous cache lines. Each entry is arranged such that a thread id in the first structure is capable of being associated with at least one contiguous cache line in at least one group, the thread identified by the thread id having accessed the at least one contiguous cache line. Patterns are mined for in the entries to locate multiples of a same thread id that repeat for at least two groups. Threads identified by the located multiples of the same thread id are mapped to at least one native thread, and are scheduled on the same processor with other threads associated with the at least two groups.

30 Claims, 4 Drawing Sheets

HARDWARE-ASSISTED METHOD FOR SCHEDULING THREADS USING DATA CACHE LOCALITY

BACKGROUND

1. Technical Field

The present invention relates generally to computer processing systems and, in particular, to a hardware-assisted method for scheduling threads using data cache locality. The method uses hardware primitives to facilitate the scheduling process, resulting in the exploitation of thread reference locality and improved performance.

2. Background Description

In a multithreaded operating system there is a fundamental problem associated with scheduling runnable threads to maximize the throughput of the system. At the speeds that current CPUs run, the performance bottleneck in executing programs is direct access to memory.

FIG. 1 is a block diagram illustrating an n-way set-associative L2 cache, according to the prior art. A request for a memory address comes in on the bus and is stored in the memory address buffer. A portion of the address is used as a tag which is hashed simultaneously in each set. In an n-way cache, at most one row in one set will have the required data. This is called a cache hit. If the tag is not found, it is a cache miss. On a cache hit, the index portion of the address is used to get an offset into the cached data and the data at that point is returned to the CPU. The element designated "V" in FIG. 1 is the valid bit. The valid bit is set if the associated data is valid; otherwise, the valid bit is reset. The element designated "DATA" in FIG. 1 is the cache line. The valid bit is associated with the cache line. Thus, the cache line may have valid or invalid data. Accordingly, the hit line and the valid bit are ANDed together to release the data (cache line). There are a number of events that may set or reset the valid bit. First, if the cache is initially empty, all of the valid bits are reset. Each valid bit is then set every time the associated cache line is placed in the cache. Each valid bit is reset when the associated line is removed from the cache. The valid bit can also be reset if the associated line is invalidated (e.g., using a cache invalidation).

Predictive caching and prefetching have increased cache hits to around 98% to 99% but a cache miss has also become more expensive, usually costing at least several hundred instruction cycles while data is brought from main memory into the L2 cache. Such a stall affects all threads that are bound to that CPU in a multi-processor environment, and in the case of shared caches, all CPUs in the system.

As more and more applications are designed around thread packages, the average number of live threads on a system has also increased. As the number of threads increases, the potential for parallelism also increases but it also stresses the cache. This impacts the threads that are bound to the CPU of the associated cache. To date, there are few alternatives, other than increasing the size of the cache (which has its own disadvantages), to address this issue.

It is therefore desirable to schedule threads that share the same data on the same CPU. This could improve the performance of multi-threaded applications by reducing the number of likely cache misses. Cache locality has been extensively studied; however, not in the context of multi-threaded scheduling algorithms.

With respect to thread scheduling based upon cache locality, existing solutions determine the inter-thread data locality by either exploiting hints derived by user annotations and compiler optimizations, evaluating information collected from hardware performance monitors, or some combination of these. Exploiting hints derived by user annotations and compiler optimizations is described in the following articles: Bellosa et al., "The Performance Implications of Locality Information Used in Shared-Memory Multiprocessors", Journal of Parallel and Distributed Computing, Vol. 37, No. 1, pp. 113–21, August 1996; Elder et al., "Thread Scheduling for Cache Locality", ASPLOS VII, pp. 60–71, October 1996; Sinharoy, B., "Optimized Thread Creation for Processor Multithreading", The Computer Journal, 40(6), pp. 388–400, 1997; and Nikolopoulos et al., "Efficient Runtime Thread Management for the Nano-Threads Programming Model", 12th International Parallel Processing Symposium and 9th Symposium on Parallel and Distributed Processing, pp. 183–94, March 1998. Evaluating information collected from hardware performance monitors is described in the following articles: Bellosa, F., "Locality-Information-Based Scheduling in Shared-Memory Multiprocessors", Workshop on Job Scheduling Strategies for Parallel Processing, IPPS, pp. 271–89, April 1996; and Weissman, B., "Performance Counters and State Sharing Annotations: a Unified Approach to Thread Locality", ASPLOS VIII, pp. 127–38, October 1998.

Accordingly, it would be desirable and highly advantageous to have a methodology for multi-thread scheduling using data cache locality.

SUMMARY OF THE INVENTION

The problems stated above, as well as other related problems of the prior art, are solved by the present invention, a hardware-assisted method for scheduling threads using data cache locality.

In particular, the invention provides a methodology for facilitating the scheduling of threads that exhibit similar cache data locality. This enables the detection of threads with data locality affinity. These pools of threads can then be scheduled to run on the same CPU, or can be used to determine how to map virtual threads onto "system" threads, for example, in a JAVA VIRTUAL MACHINE that maps m Java threads onto n system threads where m>>n. This would then improve the performance of multi-threaded applications. The invention enables this thread affinity pool detection in a user-transparent manner.

According to a first aspect of the invention, there is provided a method for scheduling threads in a multi-processor computer system having an operating system and at least one cache. In a first data structure thread ids are stored for at least some of the threads associated with a context switch performed by the operating system. Each of the thread ids uniquely identifies one of the threads. In a second data structure a plurality of entries are stored for a plurality of groups of contiguous cache lines. Each of the plurality of entries is arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines. Patterns are mined for in the plurality of entries in the second data structure to locate multiples of the same thread id that repeat with respect to at least two of the plurality of groups of contiguous cache lines. The threads identified by the located multiples of the same thread id and any other threads identified by any other thread ids associated with the at least two of the plurality of groups of contiguous cache lines are scheduled on the same processing unit.

According to a second aspect of the invention, the method further includes the step of adding and removing a group to the plurality of groups of contiguous cache lines when a contiguous cache line in the group is accessed by a given thread and when all contiguous cache lines in the group are flushed, respectively.

According to a third aspect of the invention, the method further includes the step of restricting the plurality of groups to a finite number of groups.

According to a fourth aspect of the invention, the method further includes the step of determining when there exists the finite number of groups.

According to a fifth aspect of the invention, the mining step is performed when there exists the finite number of groups.

According to a sixth aspect of the invention, the mining step is performed upon a receipt of a command.

According to a seventh aspect of the invention, the mining step is performed at least one of continuously, at predefined intervals, and upon an occurrence of at least one predefined event.

According to a eighth aspect of the invention, the mining step is performed in at least one of software and hardware.

According to a ninth aspect of the invention, wherein the second data structure is comprised of a plurality of rows and a plurality of columns.

According to a tenth aspect of the invention, wherein each of the plurality of groups of contiguous cache lines corresponds to one of the plurality of rows.

According to a eleventh aspect of the invention, each of the thread ids in the second data structure corresponds to one of the plurality of columns.

According to an twelfth aspect of the invention, the method further includes the step of allocating each of the plurality of rows to one of the plurality of groups of contiguous cache lines.

According to a thirteenth aspect of the invention, the method further includes the step of, for each of a cache line in a group in the plurality of groups of contiguous cache lines, storing an index of a row corresponding to the group containing the cache line in the cache line.

According to a fourteenth aspect of the invention, the method is implemented by a program storage device readable by machine, tangibly embodying a program of instructions executable by the machine to perform the method steps.

According to a fifteenth aspect of the invention, there is provided a method for scheduling threads in a multi-processor computer system having an operating system and at least one cache. In a first data structure thread ids are stored for at least some of the threads associated with a context switch performed by the operating system. Each of the thread ids uniquely identifies one of the threads. In a second data structure a plurality of entries are stored for a plurality of groups of contiguous cache lines. Each of the plurality of entries is arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines. Patterns are mined for in the plurality of entries in the second data structure to locate multiples of the same thread id that repeat with respect to at least two of the plurality of groups of contiguous cache lines. The threads identified by the located multiples of the same thread id are mapped to at least one native thread.

According to a sixteenth aspect of the invention, the threads identified by the located multiples of the same thread comprise m threads and the at least one native thread comprises n threads, m and n being integers, m being greater than n.

According to a seventeenth aspect of the invention, the method further includes the step of scheduling the threads identified by the located multiples of the same thread id and any other threads identified by any other thread ids associated with the at least two of the plurality of groups of contiguous cache lines on the same processing unit.

According to an eighteenth aspect of the invention, there is provided a method for scheduling threads in a multi-processor computer system having an operating system and at least one cache. In a first data structure thread ids are stored for at least some of the threads associated with a context switch performed by the operating system. Each of the thread ids uniquely identifies one of the threads. In a second data structure a plurality of entries are stored for a plurality of groups of contiguous cache lines. Each of the plurality of entries are arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines. Pools of threads are identified in the plurality of entries in the second data structure such that each of the pools of threads comprises the threads identified by the same thread id that forms a multiple with respect to one of the plurality of groups of contiguous cache lines, the multiple repeating with respect to at least two of the plurality of groups of contiguous cache lines. The threads identified by the located multiples of the same thread id and any other threads identified by any other thread ids associated with the at least two of the plurality of groups of contiguous cache lines are scheduled on the same processing unit.

These and other aspects, features and advantages of the present invention will become apparent from the following detailed description of preferred embodiments, which is to be read in connection with the accompanying drawings.

BRIEF DESCRIPTION OF THE DRAWINGS

FIG. 1 is a block diagram illustrating an n-way set-associative L2 cache, according to the prior art; and.

DETAILED DESCRIPTION OF PREFERRED EMBODIMENTS

The present invention is directed to a hardware-assisted method for scheduling threads using data cache locality. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 2 through 4.

Figure 1:
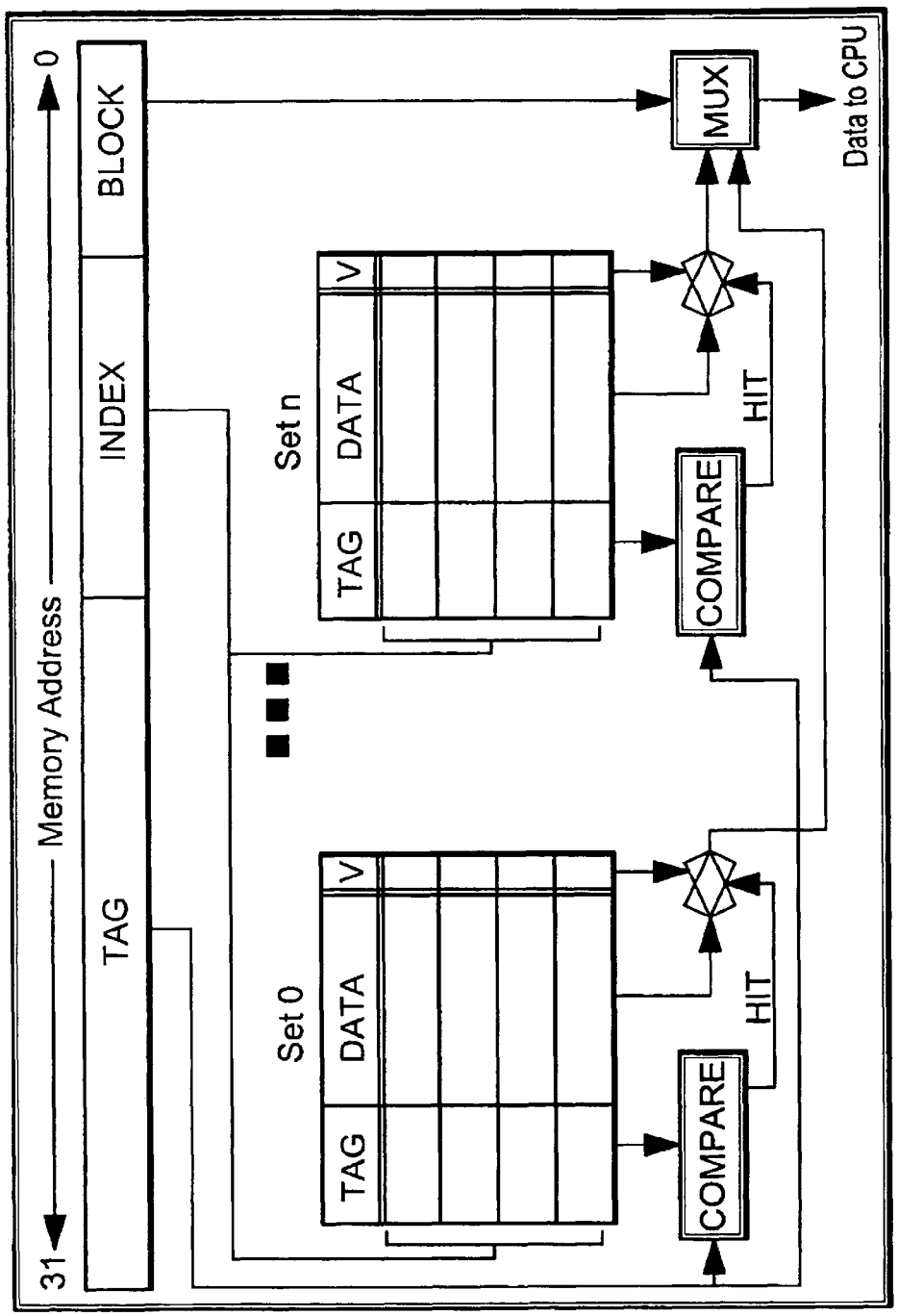

According to an illustrative embodiment of the invention, two modifications are made to the L2 cache of FIG. 1. The modified cache is shown in FIG. 2, which is a block diagram illustrating a thread identifier (TID) cache, according to an illustrative embodiment of the invention.

The first modification creates a buffer, hereinafter referred to as a "Thread ID buffer". According to the illustrative embodiment, the ThreadID buffer is either 2 bytes or 4 bytes in length, depending on the size of the largest thread id in the system. It is to be appreciated that in other embodiments of the invention, other lengths may be used based upon the largest thread id in the system and other parameters. Each time the operating system performs a context switch, the operating system puts the thread id (the unique tag that is associated with each thread) into this buffer.

The second modification is to reserve a portion of memory for cache thread ids. According to the illustrative embodiment of FIG. 2, the reserved memory portion is implemented as a Thread ID Cache. The Thread ID Cache is a table that has a fixed number of rows and columns. A row is associated with C cache lines, where C is a multiple of contiguous cache lines. Each column entry in a thread id cache row is the thread id of a thread that has accessed at least one of the C contiguous cache lines.

Figure 2:
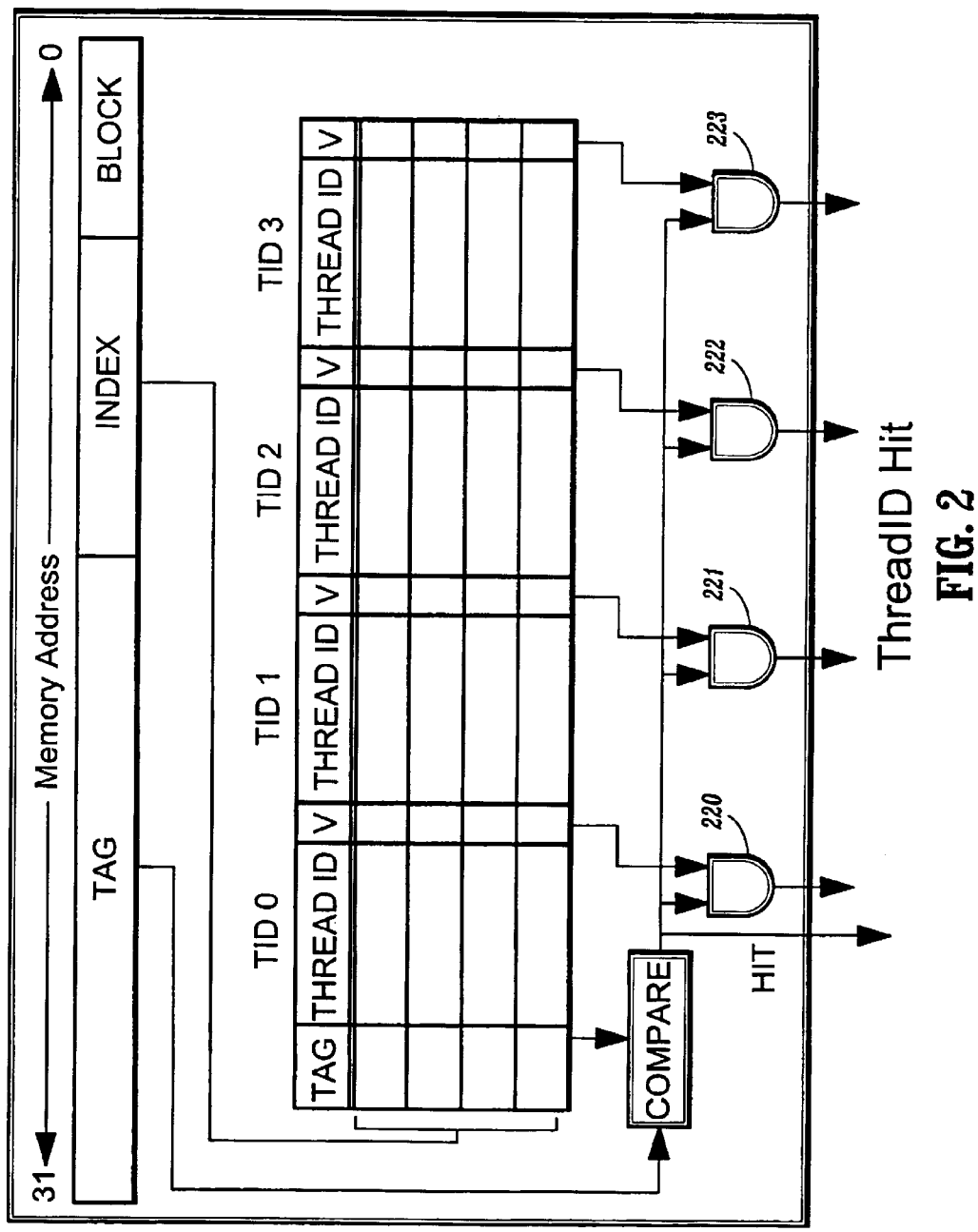
FIG. 2 is a block diagram illustrating a thread identifier (TID) cache, according to an illustrative embodiment of the invention.

The element designated "V" in FIG. 2 is the valid bit. The valid bit is set if the associated data is valid; otherwise, the valid bit is reset. Conversely, an invalid bit "I" could be used such that the invalid bit is set if the associated data is not valid; otherwise, the invalid bit is reset. AND gates 220–224 are used to determine if there is a hit on an entry (row) in the thread TID cache and if the value of the TID is valid.

There are a number of events that may set or reset the valid bit. First, if the cache is initially empty, all of the valid bits are reset. Each valid bit is then set every time the associated thread id is placed in the cache. Each valid bit is reset when the associated line is removed from the cache. The valid bit can also be reset if the associated line is invalidated (e.g., using a cache invalidation).

When a thread accesses a cache line (i.e., a cache hit is registered), the thread ID in the thread ID buffer is stored in the thread ID cache row that is associated with that cache line. An allocation mechanism allocates a thread ID cache row to the C contiguous cache lines. The cache line can store the index of its associated thread ID cache row in the cache line itself. Given the teachings of the invention provided herein, one of ordinary skill in the related art would contemplate these and various other ways in which to implement the thread ID cache.

A thread ID cache row is flushed and returned to the list of available thread ID cache rows when all its associated cache lines are flushed. As used herein, the term "flushed" means removed as an entry in the cache. Since the number of thread ID cache rows is much less than the number of cache lines, it is conceivable that when a cache line attempts to get a new thread ID cache row, there are none available. At this point the system is in a state of saturation. This is therefore a good time to mine for patterns in the thread ID cache rows.

At any time, the user can also invoke data mining techniques to identify patterns in the thread ID cache rows by invoking a synchronous command. The objective of data mining is to search the thread ID cache rows for pairs, triplets, quadruplets, and so forth, of thread IDs that repeat themselves over the rows. These threads have an affinity to share the same data and, thus, it is desirable to schedule these threads on the same CPU one after another or, in the case of mapping virtual threads to native threads, these threads could all be mapped to the same native thread. Such scheduling/mapping would allow the threads to reuse cache lines left over by the previous thread, reducing the biggest cost associated with having a large number of threads in a system, the cost of cache misses when a new thread is scheduled. It is to be appreciated that the invention is not limited to any particular data mining method and, thus, any suitable data mining method may be used with the invention while maintaining the spirit and scope thereof. Accordingly, such methods will not be further discussed herein.

Mining for patterns may be performed by hardware or software. In performing data mining using software, the rows would be passed back to the thread scheduling method on demand which would mine the rows for data. It is to be noted that there are relative costs associated with mining using either hardware or software. For example, data mining using hardware is generally more expensive, but faster than data mining using software. Consequently, data mining using software is generally cheaper, but slower than mining using hardware. Since the bulk of the cost of the above described modifications are related to the amount of silicon used to capture the thread IDs in the thread ID cache rows, the relative overhead to mine in hardware is much cheaper for the amount of speedup that it affords.

Figure 3:
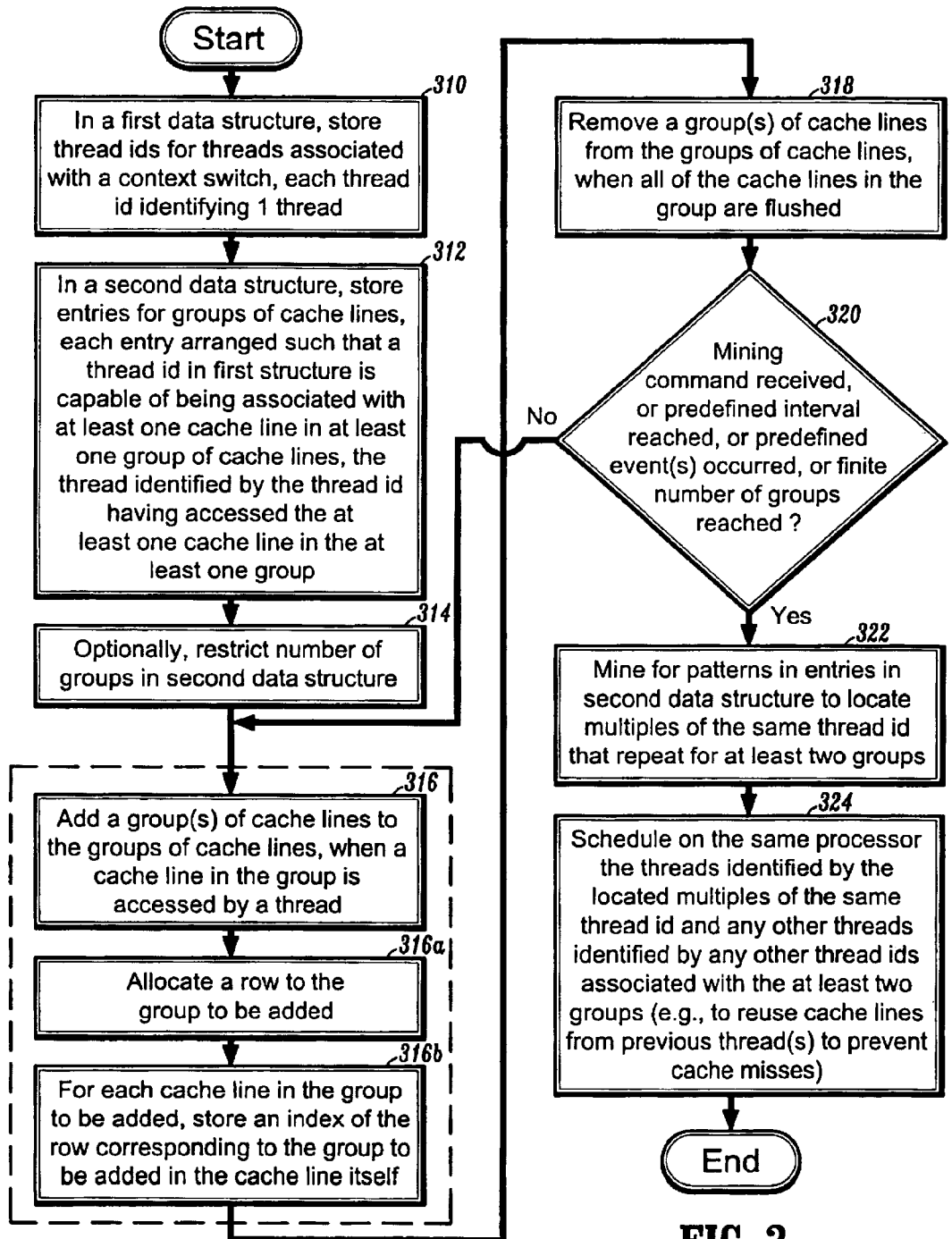
FIG. 3 is a flow diagram illustrating a method for scheduling threads in a multi-processor computer system having an operating system and at least one cache, according to an illustrative embodiment of the invention.

FIG. 3 is a flow diagram illustrating a method for scheduling threads in a multi-processor computer system having an operating system and at least one cache, according to an illustrative embodiment of the invention. In a first data structure (thread id buffer) thread ids are stored for at least some of the threads associated with a context switch performed by the operating system (step 310). Each of the thread ids uniquely identifies one of the threads.

In a second data structure, a plurality of entries are stored for a plurality of groups of contiguous cache lines (step 312). Each of the plurality of entries are arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines. Optionally, the number of groups in the plurality of groups of contiguous cache lines (i.e., the number of groups in the second data structure) may be restricted to a finite number (step 314).

In a preferred embodiment, the second data structure includes a plurality of rows and a plurality of columns, wherein each of the plurality of groups of contiguous cache lines corresponds to one of the plurality of rows, and each of the thread ids in the second data structure corresponds to one of the plurality of columns.

A group(s) is added to the plurality of groups of contiguous cache lines when a contiguous cache line in the group is accessed by a thread (step 316). With respect to the preferred embodiment, step 316 includes the step of allocating a row to the group to be added (step 316a) and, for each cache line in a group, an index of the row corresponding to the group containing the cache line is stored in the cache line itself (step 316b).

A group(s) is removed from the plurality of groups of contiguous cache lines when all of the cache lines in the group are flushed (step 318).

It is determined whether a mining command has been received, a predefined interval has been reached, a predefined event(s) has occurred, or the finite number of groups has been reached (step 320). Any of the preceding triggers, as well as others readily contemplated by those of ordinary skill in the art, and combinations thereof, may be used to initiate data mining as per the following step. The finite number of groups is reached when, for example, the system is at saturation and there are no more rows left. In the case of a mining command, such command may be a synchronous command. If the determination performed at step 320 yields an affirmative response, the method proceeds to step 322. Otherwise, the method returns to step 316.

At step 322, patterns are mined for in the plurality of entries in the second data structure to locate multiples (e.g., pair, triplets, quadruplets, and so forth) of the same thread id that repeat with respect to at least two of the plurality of groups of contiguous cache lines (i.e., that repeat over at least two rows with respect to the preferred embodiment). It is to be appreciated that the mining step may be performed in software, hardware, or a combination thereof.

The threads identified by the located multiples of the same thread id (i.e., the threads identified by the mining step) and any other threads identified by any other thread ids associated with the at least two of the plurality of groups of contiguous cache lines (i.e., the threads corresponding to the thread ids in the columns that intersect the rows corresponding to the at least two of the plurality of groups of contiguous cache lines) are scheduled on the same processing unit (step 324).

Figure 4:
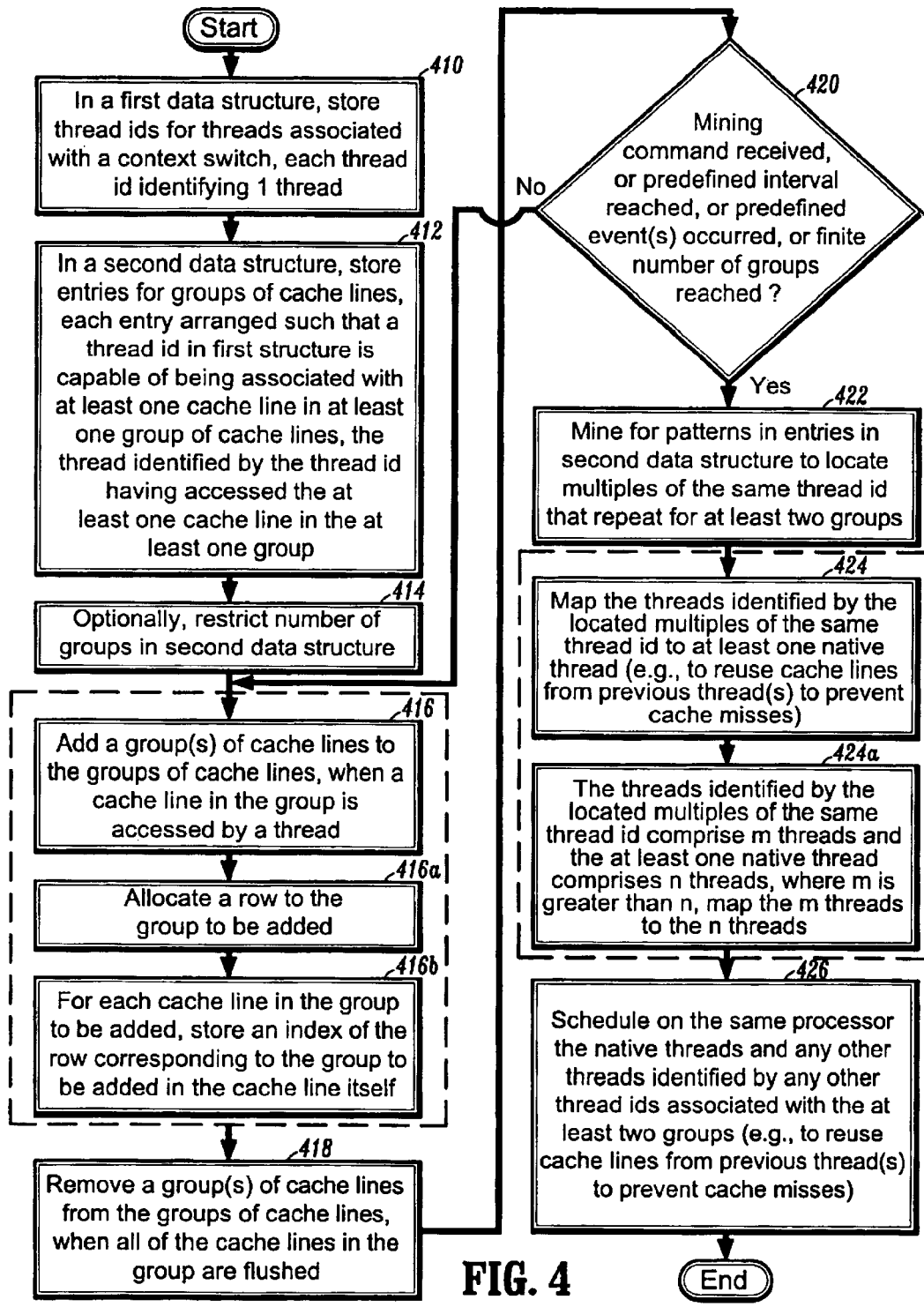
FIG. 4 is a flow diagram illustrating a method for scheduling threads in a multi-processor computer system having an operating system and at least one cache, according to another illustrative embodiment of the invention.

FIG. 4 is a flow diagram illustrating a method for scheduling threads in a multi-processor computer system having an operating system and at least one cache, according to another illustrative embodiment of the invention. In a first data structure (thread id buffer) thread ids are stored for at least some of the threads associated with a context switch performed by the operating system (step 410). Each of the thread ids uniquely identifies one of the threads.

In a second data structure, a plurality of entries are stored for a plurality of groups of contiguous cache lines (step 412). Each of the plurality of entries are arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines. Optionally, the number of groups in the plurality of groups of contiguous cache lines (i.e., the number of groups in the second data structure) may be restricted to a finite number (step 414).

In a preferred embodiment, the second data structure includes a plurality of rows and a plurality of columns, wherein each of the plurality of groups of contiguous cache lines corresponds to one of the plurality of rows, and each of the thread ids in the second data structure corresponds to one of the plurality of columns.

A group(s) is added to the plurality of groups of contiguous cache lines when a contiguous cache line in the group is accessed by a thread (step 416). With respect to the preferred embodiment, step 416 includes the step of allocating a row to the group to be added (step 416a) and, for each cache line in a group, an index of the row corresponding to the group containing the cache line is stored in the cache line itself (step 416b).

A group(s) is removed from the plurality of groups of contiguous cache lines when all of the cache lines in the group are flushed (step 418).

It is determined whether a mining command has been received, a predefined interval has been reached, a predefined event(s) has occurred, or the finite number of groups has been reached (step 420). Any of the preceding triggers, as well as others readily contemplated by those of ordinary skill in the art, and combinations thereof, may be used to initiate data mining as per the following step. The finite number of groups is reached when, for example, the system is at saturation and there are no more rows left. In the case of a mining command, such command may be a synchronous command. If the determination performed at step 420 yields an affirmative response, the method proceeds to step 422. Otherwise, the method returns to step 416.

At step 422, patterns are mined for in the plurality of entries in the second data structure to locate multiples (e.g., pair, triplets, quadruplets, and so forth) of the same thread id that repeat with respect to at least two of the plurality of groups of contiguous cache lines (i.e., that repeat over at least two rows with respect to the preferred embodiment). It is to be appreciated that the mining step may be performed in software, hardware, or a combination thereof.

The threads identified by the located multiples of the same thread id are mapped to at least one native thread (step 424). In an alternate embodiment of FIG. 4, the threads identified by the located multiples of the same thread comprise m threads and the at least one native thread comprises n threads, with m and n being integers, and m being greater than n. In such a case, the m threads are mapped to the n native threads (step 424a). Them threads in step 424a may, for example, correspond to JAVA VIRTUAL MACHINE (JVM) threads.

In either of mapping steps 424 and 424a, the mapping allows the threads identified by the located multiples of the same thread id to resuse cache lines left over by a previous thread. The reuse is implemented so as to prevent cache misses.

Optionally, but preferably, the native threads (of either step 424 or step 424a) corresponding to the threads identified by the located multiples of the same thread id (i.e., the threads identified by the mining step) and any other threads identified by any other thread ids associated with the at least two of the plurality of groups of contiguous cache lines (i.e., the threads corresponding to the thread ids in the columns that intersect the rows corresponding to the at least two of the plurality of groups of contiguous cache lines) are scheduled on the same processing unit (step 426).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for scheduling threads in a multi-processor computer system having an operating system at least one cache, comprising the steps of:
   storing in a first data structure thread ids for at least some of the threads associated with a context switch performed by the operating system, each of the thread ids uniquely identifying one of the threads;
   storing in a second data structure a plurality of entries for a plurality of groups of contiguous cache lines, each of the plurality of entries arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines;
   adding a group to the plurality of groups of contiguous cache lines when a contiguous cache line in the group is accessed by a given thread;
   removing a group from the plurality of groups of contiguous cache lines when all contiguous cache lines in the group are flushed;
   mining for patterns in the plurality of entries in the second data structure to locate multiples of a same thread id that repeat with respect to at least two of the plurality of groups of contiguous cache lines; and
   scheduling on a same processing unit the threads identified by the located multiples of the same thread id and any other threads identified by any other thread ids associated with the at least two of the plurality of groups of contiguous cache lines.

2. The method according to claim 1, further comprising the step of restricting the plurality of groups to a finite number of groups.

3. The method according to claim 2, further comprising the step of determining when there exists the finite number of groups.

4. The method according to claim 2, wherein said mining step is performed when there exists the finite number of groups.

5. The method according to claim 1, wherein said mining step is performed upon a receipt of a command.

6. The method according to claim 1, wherein said mining step is performed at least one of continuously, at predefined intervals, and upon an occurrence of at least one predefined event.

7. The method according to claim 1, wherein said mining step is performed in at least one of software and hardware.

8. The method according to claim 1, wherein said second data structure is comprised of a plurality of rows and a plurality of columns.

9. The method according to claim 8, wherein each of the plurality of groups of contiguous cache lines corresponds to one of the plurality of rows.

10. The method according to claim 8, wherein each of the thread ids in the second data structure corresponds to one of the plurality of columns.

11. The method according to claim 10, wherein each of the plurality of groups of contiguous cache lines corresponds to one of the plurality of rows and the any other threads correspond to any of the plurality of columns that intersect any of the plurality of rows corresponding to the at least two of the plurality of groups.

12. The method according to claim 8, further comprising the step of allocating each of the plurality of rows to one of the plurality of groups of contiguous cache lines.

13. The method according to claim 9, further comprising the step of, for each of a cache line in a group in the plurality of groups of contiguous cache lines, storing an index of a row corresponding to the group containing the cache line in the cache line.

14. The method according to claim 1, wherein said method is implemented by a program storage device readable by a machine, tangibly embodying a program of instructions executable by the machine to perform said method steps.

15. A method for scheduling threads in a multi-processor computer system having an operating system at least one cache, comprising the steps of:
    storing in a first data structure thread ids for at least some of the threads associated with a context switch performed by the operating system, each of the thread ids uniquely identifying one of the threads;
    storing in a second data structure a plurality of entries for a plurality of groups of contiguous cache lines, each of the plurality of entries arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines;
    adding a group to the plurality of groups of contiguous cache lines when a contiguous cache line in the group is accessed by a given thread;
    removing a group from the plurality of groups of contiguous cache lines when all contiguous cache lines in the group are flushed;
    mining for patterns in the plurality of entries in the second data structure to locate multiples of a same thread id that repeat with respect to at least two of the plurality of groups of contiguous cache lines;
    mapping the threads identified by the located multiples of the same thread id to at least one native thread; and
    scheduling on a same processing unit the threads identified by the located multiples of the same thread id and any other threads identified by any other thread ids associated with the at least two of the plurality of groups of contiguous cache lines.

16. The method according to claim 15, wherein the threads identified by the located multiples of the same thread comprise m threads and the at least one native thread comprises n threads, m and n being integers, m being greater than n.

17. The method according to claim 15, further comprising the step of restricting the plurality of groups to a finite number of groups.

18. The method according to claim 15, further comprising the step of determining when there exists the finite number of groups.

19. The method according to claim 15, wherein said mining step is performed when there exists the finite number of groups.

20. The method according to claim 15, wherein said mining step is performed upon a receipt of a command.

21. The method according to claim 15, wherein said mining step is performed at least one of continuously, at predefined intervals, and upon an occurrence of at least one predefined event.

22. The method according to claim 15, wherein said mining step is performed in at least one of software and hardware.

23. The method according to claim 15, wherein said second data structure is comprised of a plurality of rows and a plurality of columns.

24. The method according to claim 23, wherein each of the plurality of groups of contiguous cache lines corresponds to one of the plurality of rows.

25. The method according to claim 23, wherein each of the thread ids in the second data structure corresponds to one of the plurality of columns.

26. The method according to claim 25, wherein each of the plurality of groups of contiguous cache lines corresponds to one of the plurality of rows and the any other threads correspond to any of the plurality of columns that intersect any of the plurality of rows corresponding to the at least two of the plurality of groups.

27. The method according to claim 24, further comprising the step of allocating each of the plurality of rows to one of the plurality of groups of contiguous cache lines.

28. The method according to claim 24, further comprising the step of, for each of a cache line in a group in the plurality of groups of contiguous cache lines, storing an index of a row corresponding to the group containing the cache line in the cache line.

29. The method according to claim 15, wherein said method is implemented by a program storage device readable by a machine, tangibly embodying a program of instructions executable by the machine to perform said method steps.

30. A method for scheduling threads in a multi-processor computer system having an operating system at least one cache, comprising the steps of:

storing in a first data structure thread ids for at least some of the threads associated with a context switch performed by the operating system, each of the thread ids uniquely identifying one of the threads;

storing in a second data structure a plurality of entries for a plurality of groups of contiguous cache lines, each of the plurality of entries arranged such that a thread id in the first data structure is capable of being associated with at least one of the contiguous cache lines in at least one of the plurality of groups of contiguous cache lines, the thread identified by the thread id having accessed the at least one of the contiguous cache lines in the at least one of the plurality of groups of contiguous cache lines;

adding a group to the plurality of groups of contiguous cache lines when a contiguous cache line in the group is accessed by a given thread;

removing a group from the plurality of groups of contiguous cache lines when all contiguous cache lines in the group are flushed;

identifying pools of threads in the plurality of entries in the second data structure such that each of the pools of threads comprises the threads identified by a same thread id that forms a multiple with respect to one of the plurality of groups of contiguous cache lines, the multiple repeating with respect to at least two of the plurality of groups of contiguous cache lines; and scheduling on a same processing unit the threads identified by the located multiples of the same thread id and any other threads identified by any other thread ids associated with the at least two of the plurality of groups of contiguous cache lines.

* * * * *